Figure 2:
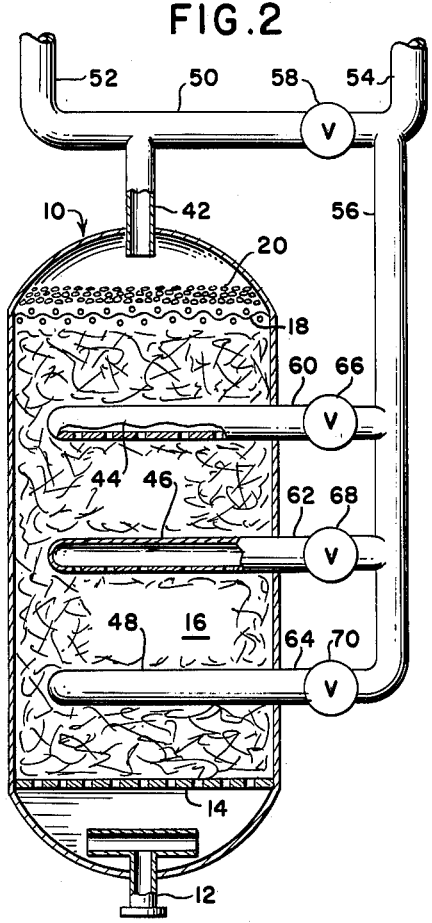

Aug. 17, 1965  W. H. DECKER  3,201,340
METHOD AND APPARATUS FOR THE CATALYTIC REFORMING
OF NAPHTHAS IN SERIES
Filed Jan. 23, 1962

WILLIAM H. DECKER
*INVENTOR.*

BY
*Adams, Forward & McLean*

ATTORNEYS

United States Patent Office 3,201,340
Patented Aug. 17, 1965

3,201,340
METHOD AND APPARATUS FOR THE CATALYTIC REFORMING OF NAPHTHAS IN SERIES
William H. Decker, Chicago, Ill., assignor to Sinclair Research, Inc., New York, N.Y., a corporation of Delaware
Filed Jan. 23, 1962, Ser. No. 168,163
4 Claims. (Cl. 208—65)

This invention relates to the catalytic reforming of petroleum naphtha. More specifically this invention relates to a new and improved apparatus and method of operation for a multiple bed catalytic reforming system. Particularly, the instant invention provides apparatus and method of operation for a multiple bed catalytic reforming system permitting wide flexibility in charge stock quantity and quality with concomitant optimization of liquid gasoline yields.

In the reforming of hydrocarbons, particularly straight run naphtha fractions, using for instance a platinum group metal-alumina catalyst, various reactions ocur such as isomerization, dehydrocyclization, dehydrogenation, and hydrocracking all of which lead to hydrocarbon products of increased octane ratings usually greater than about 80–85 RON (clear). After a period of use in such a system, however, the catalyst becomes gradually deactivated due to the deposition of coke particles on the surface of the catalyst and consequently a decrease in the octane values of the reformate product is observed. If the octane requirements imposed upon the particular system are to be continuously met, the catalyst must, therefore, be restored in activity with this usually being accomplished by various regeneration techniques involving burning the carbon from the catalyst by contact with an oxygen-containing gas.

The reforming process is conventionally carried out under conditions including contacting the feed stock, for instance, a straight run naphtha, with a reforming catalyst at about 875–975° F. and at about 250–500 p.s.i.g. pressure at a weight hourly space velocity (WHSV) within the range of about 0.5 to 5 and a hydrogen recycle ratio of about 4 to 12 moles of hydrogen per mole of naphtha feed. The catalyst employed can consist essentially of a carrier based platinum group metal and generally have a platinum group metal content of 0.1 to 2.0% by weight. Suitable carriers are of the refractory oxide type and include alumina especially activated alumina, silica, boria, zirconia, magnesia and combinations of these refractory oxides. Preferred carriers contain alumina alone or as the major component and can include components which react with alumina to form an acidic catalyst, such as chlorine, fluorine, silica, boria, and the like. The platinum group metal of the catalyst is the essential component and these metals include for instance platinum, palladium, rhodium and iridium. A catalyst employed advantageously is a supported platinum catalyst containing for instance about 0.3 to 1.0% by weight platinum and the support is alumina characterized for instance by high surface area and large pore size. Such catalysts can be conveniently prepared as described in U.S. Patents Nos. 2,838,444 and 2,838,445. When employing these reforming operations a plurality of adiabatic catalyst beds are usually provided, for instance 3, 4, 5 or more in number, and the hydrocarbon feed can be preheated to the desired inlet temperature before entry into each succeeding catalyst bed.

As described in U.S. Patent 2,654,694 issued on October 6, 1953, to Charles V. Berger et al., a method has been proposed for operation of a multiple bed catalytic reforming system to provide for the economical utilization and minimum quantity of platinum metal catalyst. The proposed method includes proportioning the catalyst among the beds so that each of the beds succeeding the first contains a quantity of catalyst at least equal to that in the first bed of the series and the last bed of the series contains a greater quantity of catalyst than each preceding bed. Similarly, U.S. Patent 3,007,862 issued on November 7, 1961, to James L. Patton et al. describes a multiple bed catalytic reforming system wherein the last bed of the series contains a greater quantity of catalyst than each preceding bed and the first bed contains between about 1.1 and 3 times the volume of catalyst in the second bed.

In a multiple bed essentially adiabatic reaction system a plurality of fixed beds containing the reforming catalyst can be arranged for serial flow of the feed stock and in such a manner that the beds can be removed from the processing cycle, usually one at a time, and the catalyst regenerated without a break in the continuity of operation. Subsequently the regenerated bed can be placed on stream with another bed being removed to undergo regeneration in like manner. This procedure is particularly applicable to catalyst beds or reactors subsequent in line to the initial reactor, preferably the terminal reactor, in order to extend the length of the processing cycle since the catalyst in a subsequent reactor is more quickly deactivated than that in the preceding reactor. This deactivation is due to the maintenance of a higher average temperature in the subsequent reactor catalyst bed.

As a result the catalyst in each succeeding reactor will become partially deactivated in less time than the catalyst in the preceding reactor and in order to insure a high grade reformate, the catalyst in the reactors is periodically regenerated. This can be accomplished in a multiple bed system by, for instance, blocking out a reactor, which may be a so called swing reactor, while the remaining reactors are continued in a normal processing cycle. The blocked out reactor, in order to regenerate the catalyst contained therein, can be depressured and purged with an inert gas. After purging, a flow of free oxygen containing regeneration gas is established, and regeneration initiated. The regeneration can be conducted at a temperature in the range of about 700–950° F. with the final stage being conducted at about 850–950° F. When the activity of the catalyst has been restored, i.e., when the predominant portion of the carbon deposit is burned off, the oxygen flow is stopped and the inert gas flow started. The system can be then depressured and evacuated several times in order to insure complete oxygen removal. Prior to placing the reactor on stream again, it is pressured with a hydrogen rich gas from the recycle system and when operating pressures have been attained the block valves are opened, placing the unit in the reforming cycle. Subsequently, another reactor can be treated in substantially the same manner.

In the design of a commercial reforming reaction system as above described there are many factors of significance but one of the most important is that of liquid product yield. Such yield is primarily influenced by naphtha quality including naphthene content or boiling range, system operating pressure, system operating temperatures, space velocity and hydrogen containing gas recycle ratio. For any given system the naphtha quality, operating pressure and space velocity are usually fixed by the design basis. The gas recycle ratio is also generally fixed. As a result, the operation of the reforming reaction system as finally designed and constructed is controlled as to severity, i.e., reformate final octane, primarily by means of varying reactor temperatures and even such temperature variation is to a large extent limited by the catalyst inventory, naphtha quality and required severity. This limited flexibility of the operation of the reforming reaction system imposed by its design and by the fact that the operator has little or no control over naphtha quality, required severity and catalyst inventory often requires operation of the reaction system at less than optimum conditions for maximum liquid yields such as, for example, when throughput may fall below design capacity or when naphtha quality falls below design requirements.

In accordance with the method and apparatus of this invention additional flexibility is provided in the operation of a reforming reaction system by the inclusion of means for varying the effective catalyst inventory in response to variations in hydrocarbon charge stock charge rate and hydrocarbon charge stock naphthene content so that weight hourly space velocity can be optimized for maximum liquid yield while maintaining the operating continuity of the process.

With conventional catalytic reforming systems where hydrocarbon charge rate is to be maintained constant, it is necessary to discontinue the reforming process, disassemble the reactors and add or remove catalyst in order to effect a variation in space velocity. Even in reforming systems employing two terminal reactors operating in parallel, when one of the terminal reactors is removed from the system for catalyst regeneration, it is necessary to increase the operating temperature of the remaining terminal reactor in order to offset the resulting disadvantageous space velocity and maintain the product octane number with a resulting decrease in liquid product yield.

In accordance with the present invention the means for varying the effective catalyst inventory comprises means provided in at least the last reactor of the series for diverting the flow of the hydrocarbon stream through varying quantities of catalyst within the reactor. The means for diverting the flow of the hydrocarbon stream is, of course, operable while maintaining the operating continuity of the process.

The improvement of my invention further comprises means in at least the last reactor of the series for introducing hydrogen rich recycle gas to that portion of the catalyst through which the hydrocarbon stream does not flow in order to prevent excessive hydrocracking in that portion of the bed when it is taken out of service.

In order to minimize the expense of installation of means for permitting operation in accordance with this invention, the multiple bed reactor system is advantageously designed in accordance with the teachings of the above mentioned Patent Number 2,654,694 to Berger et al. For example, in such a system employing three reactors approximately one half or more of the catalyst is contained in the last reactor and hence large changes in the effective catalyst inventory can be effected by modification of a single reactor in accordance with this invention.

It must be understood that the improvement of the invention functions to vary the effective catalyst inventory of the system without the physical addition to or removal from the reaction zones of any catalyst. As mentioned previously, in a catalytic reforming system the major portion of the catalyst is often located in the last reaction zone of the series. Thus, a variation in the effective catalyst inventory in the last reaction zone of the series will substantially vary the total effective catalyst inventory of the system. Thus, the specific catalyst inventory required in, for instance, the last reactor of a three reactor system can readily be determined from the following relationship:

Effective catalyst inventory in terminal reactor
$= (FR/WHSV) - C_k$ where $FR$ = hydrocarbon feed rate (pounds per hour)

$WHSV$ = predetermined optimum weight hourly space velocity (pounds of charge stock per pound of catalyst per hour)

$C_k$ = quantity of catalyst contained in all reaction zones other than the last zone The principles underlying this invention are illustrated by the following data which show the effect of space velocity on liquid yields of gasoline for a typical Mid-Continent naphtha when operating at severity levels required to produce product octanes of 90, 95 and 100 RON (clear).

TABLE I

| Severity RON (clear) | 90 | | | 95 | | | 100 | | |
|---|---|---|---|---|---|---|---|---|---|
| Space Velocity, WHSV [1] | 0.5 | 1.0 | 3.0 | 0.5 | 1.0 | 3.0 | 0.5 | 1.0 | 3.0 |
| Yields: | | | | | | | | | |
| Hydrogen, wt. percent | 1.6 | 1.8 | 1.9 | 1.8 | 2.0 | 2.2 | 1.9 | 2.1 | 2.3 |
| Dry Gas, wt. percent | 6.4 | 5.7 | 4.8 | 8.4 | 7.4 | 6.2 | 11.7 | 10.1 | 8.7 |
| Butanes, vol. percent | 5.0 | 4.3 | 3.4 | 6.2 | 5.6 | 4.2 | 8.8 | 7.3 | 5.6 |
| $C_5$+Gaso., vol. percent | 84.9 | 85.5 | 86.7 | 81.3 | 82.1 | 83.6 | 75.1 | 77.2 | 78.7 |
| 10# RVP Gaso., vol. percent | 95.5 | 97.0 | 99.0 | 91.0 | 92.7 | 95.0 | 83.5 | 86.8 | 89.1 |

[1] Weight of oil per hour divided by weight of catalyst.

From the data in Table I it is evident that the ability to adjust the operating space velocity, i.e., effective catalyst inventory, is of considerable significance in maintaining optimum gasoline yields.

While the preceding discussion has been directed to changes in the feed rate of the charge stock it will be understood that the basic principles are equally applicable where there is a variation in the quality of the charge stock, i.e., a decrease in naphthene content, while the feed rate remains constant, thereby presenting a situation in which it is necessary to operate at a different optimum weight hourly space velocity from that for which the system was designed if maximum liquid product yields are to be obtained.

When there is a variation in factors underlying the design basis for a particular system, for example, hydrocarbon charge stock charge rate and/or naphthene content, then the above equation can be employed. By substituting the known quantities in the equation the effective catalyst inventory required in the terminal reactor can be determined. Thus, in accordance with my invention the hydrocarbon stream is flowed through only that portion of the terminal reactor which contains the quantity of catalyst equal to the effective catalyst inventory determined from the above equation. Since the hydrocarbon stream now does not pass through the remaining portion of the catalyst in the terminal reactor, such portion of the catalyst is effectively removed from the system without physically removing it from the reactor.

In order to better illustrate the improvement of my invention reference is made to the following examples:

*Example I*

In this example a typical catalytic reforming system consisting of three reactors in series with interheating between the reactors is employed. The catalyst is distributed among the three reactors in a ratio of 1:2:6. A typical Mid-Continent naphtha having the following inspection is employed as the charge stock.

| | | |
|---|---|---|
| Gravity | °API | 58.4 |
| IBP | °F | 212 |
| 10% | °F | 226 |
| 50% | °F | 239 |
| 90% | °F | 262 |
| EP | °F | 276 |
| Paraffin | percent (by volume) | 42.0 |
| Naphthenes | do | 52.0 |
| Aromatics | do | 6.0 |
| Sulfur | wt. percent | 0.010 |
| Arsenic | p.p.m | 4.0 |

Table II below shows the charge rate used as the design basis in the system, the predetermined optimum weight hourly space velocity for such charge stock, and distribution of the total catalyst inventory.

TABLE II

| | | |
|---|---|---|
| Feed rate | b.p.d. | 10,000 |
| Space velocity | WHSV | 3.0 |
| Catalyst inventory: | | |
| No. 1 Reactor | lbs. | 4,100 |
| No. 2 Reactor | lbs. | 8,200 |
| No. 3 Reactor | lbs. | 24,600 |

Table III illustrates the effect of variations in throughput on the overall space velocity of the system.

TABLE III

| Throughput, b.p.d. | Space velocity, WHSV |
|---|---|
| 5000 | 1.5 |
| 6000 | 1.8 |
| 7000 | 2.1 |
| 8000 | 2.4 |
| 9000 | 2.7 |
| 10,000 | 3.0 |

Illustrative of the effect of operating at the various weight hourly space velocities is the yield obtained when operating at a reduced throughput of 7000 barrels per day. In such instance the space velocity is lowered to 2.1 with a consequent reduction in overall yield of about 2.0 volume percent at 90 RON and a reduction of 2.2 volume percent at 100 RON. In order to prevent such loss in yield the weight hourly space velocity is returned to its predetermined optimum of 3.0. To determine the effective catalyst inventory required in the third reactor the equation described below is employed:

$$\text{Effective catalyst inventory} = \frac{FR}{WHSV} - C_k$$

where each of the expressions has the same meaning as explained above. Thus, $$\text{Effective catalyst inventory} = \frac{7000 \times 11.07^1}{3} - 12,300$$

$$= 25,830 - 12,300$$

Effective catalyst inventory = 13,530

[1] Conversion factor for converting barrels per day to pounds per hour.

Therefore, by flowing the naphtha stream through only 13,530 lb. of the catalyst contained in the last reactor, the weight hourly space velocity of the system is returned to its optimum value of 3.0 and the entire system is now operated under conditions optimizing yield.

Example II

In this example a three reactor reforming unit designed for the processing of a typical Mid-Continent naphtha at 95 RON (clear) is employed. The total quantity of catalyst in the system and the distribution of the catalyst is the same as in Example I. A typical Mid-Continent naphtha is processed at 95 RON (clear). Subsequently a poor quality Middle-East naphtha is processed at 90 RON (clear). In both operations a feed rate of 5000 barrels per day and a weight hourly space velocity of 1.5 is employed. The yields obtained are set forth in Table IV.

TABLE IV

| Naphtha | Mid-Continent | Middle East |
|---|---|---|
| Analysis: | | |
| Paraffins, vol. percent | 42.0 | 67.0 |
| Naphthenes, vol. percent | 52.0 | 19.0 |
| Aromatics, vol. percent | 6.0 | 14.0 |
| Severity (clear) | 95 RON | 90 RON |
| $C_5$ Plus Gasoline Yield, vol. percent | 76.3 | 76.4 |

Experimental determinations indicate that the optimum weight hourly space velocity for maximum yield of the poor quality Middle East naphtha are of the order of 2.5. To determine the effective catalyst inventory required in the third reactor the equation described below is employed.

$$\text{Effective catalyst inventory} = \frac{FR}{WHSV} - C_k$$

where each of the expressions has the same meaning as explained above. Thus, $$\text{Effective catalyst inventory} = \frac{5000 \times 11.07^1}{2.5} - 12,300$$

$$= 22,140 - 12,300$$

Effective catalyst inventory = 9840

[1] Conversion factor for converting barrels per day to pounds per hour.

While maintaining the same feed rate of 5000 barrels per day, the effective catalyst inventory in the terminal reactor is reduced to 9840 pounds thereby increasing the weight hourly space velocity from 1.5 up to 2.5. Operating at the higher space velocity the yield from the poor quality naphtha is raised from 76.4 vol. percent up to 78.2 vol. percent.

Figure 1:
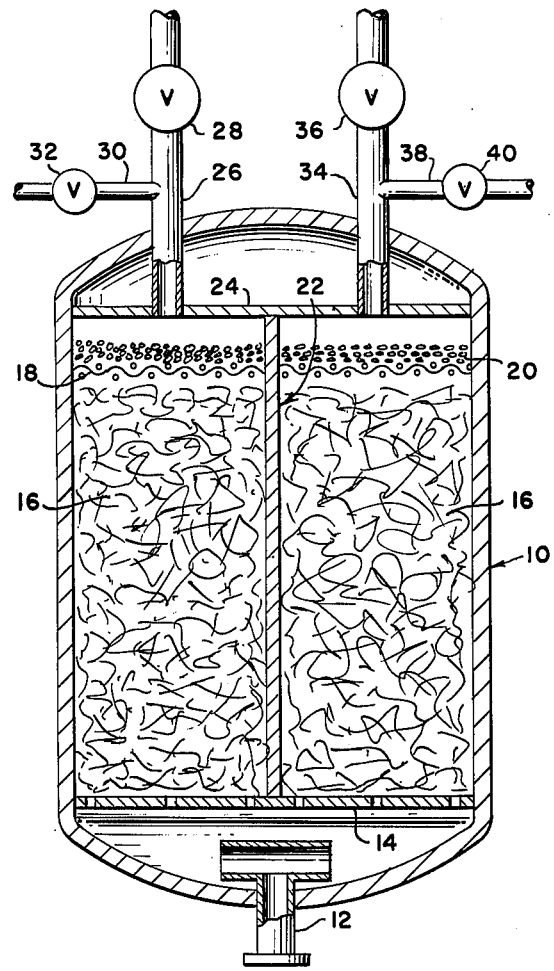

In order to illustrate the apparatus of my invention, reference is made to the attached drawing in which:

FIGURE 1 is a schematic illustration of one apparatus embodying my invention; and FIGURE 2 is a schematic illustration of another apparatus embodying my invention.

FIGURE 1 shows a generally cylindrical, vertically disposed catalytic reforming reactor 10. At the bottom of reactor 10 is a reactor outlet line 12 and immediately above the reactor outlet 12 is a horizontally disposed catalyst bed support 14. Generally the catalyst bed support 14 can be any perforate sheet or grid. As shown in the drawing, the bed of platinum metal catalyst 16 is disposed above the support 14 and supported thereby. At the upper end of the catalyst bed 16 is located a screen 18 on which are disposed several layers of alumina balls 20. The purpose of the alumina balls 20 is to prevent the catalyst bed 16 from being disturbed by the introduction of the charge stock. This much of reactor 10 is typical of catalytic reforming reactors generally in use today.

In accordance with my invention, reactor 10 is also provided with a liquid and vapor impervious internal baffle member 22. As can be seen from the drawing, baffle member 22 is vertically disposed within reactor 10 and extends upwardly from catalyst bed support 14. Proximate the upper end of reactor 10 is located a liquid and vapor impervious cover member 24 horizontally disposed within reactor 10 and extending across the entire internal diameter of reactor 10. The lower surface of cover member 24 is connected to the upper edge of baffle member 22, thereby defining with the vertical baffle member 22 and the cylindrical walls of reactor 10 two generally semi-cylindrical volumes within reactor 10. At the upper end of reactor 10 is located a charge stock inlet conduit 26 passing through the upper end of reactor 10 and cover member 24 communicating with one of the semi-cylindrical volumes described above. Inlet conduit 26 is provided with a valve 28. Recycle gas conduit 30 communicates with inlet conduit 26 intermediate valve 28 and reactor 10. Conduit 30 is also provided with a valve 32. Similarly, another inlet conduit 34 extends through the top of reactor 10 and cover member 24 and communicates with the interior of the other of the semi-cylindrical volumes described above. Inlet conduit 34 is also provided with a valve 36. Another recycle gas conduit 38 is shown in communication with inlet conduit 34 intermediate valve 36 and reactor 10. Recycle conduit 38 is also provided with a valve 40.

In normal operation both valves 28 and 36 are open while valves 32 and 40 are closed. Each of the conduits 26 and 34 is connected to carry the total effluent from the preceding reactor in the system or from the charge preheater to reactor 10. Thus, in normal operation the hydrocarbon stream being processed flows through the entire quantity of catalyst in reactor 10. If, however, it is desired to reduce the effective catalyst inventory of reactor 10 because of a lowered unit throughput or other reason, then one of the valves in the inlet conduits, for instance valve 36, is closed. Closing valve 36 effectively removes one half of the total catalyst in reactor 10 from the processing system. Further, when valve 36 is closed, valve 40 can be opened thereby introducing recycle gas only to that portion of the catalyst through which the hydrocarbon stream is not flowing. The purpose of introducing the recycle gas is to prevent excessive hydrocracking from occurring in that portion of the catalyst bed which has been effectively taken out of service and to maintain pressure in that portion of the bed taken out of service.

FIGURE 2 illustrates another apparatus embodying my invention. This figure also shows reactor 10 having a product outlet 12, a catalyst bed support 14, catalyst bed 16, a screen 18 and several layers of alumina balls 20. As shown in FIGURE 2, there is a vertically disposed main inlet conduit 42 extending through the top of reactor 10 and communicating with the interior thereof. Also shown in FIGURE 2 are a plurality of perforate conduits 44, 46 and 48 horizontally disposed one above the other within that portion of the reactor occupied by the catalyst bed 16. In the particular embodiment illustrated in this figure, perforate conduit 44 is spaced from the top of the catalyst bed a distance equal to one fourth the total height of the bed, perforate conduit 46 is spaced from the top of the catalyst bed a distance equal to one half the total height of the catalyst bed, and perforate conduit 48 is spaced from the top of the catalyst bed a distance equal to three quarters of the total height of the catalyst bed. In the upper part of FIGURE 2 is shown a horizontal conduit 50 communicating by line 52 with a recycle gas compressor and by line 54 with the preceding reactor in the series. Further, conduit 50 communicates with inlet conduit 42 proximate line 52, while conduit 50 proximate line 54 communicates with manifold 56. Conduit 50 is provided with a valve 58 positioned intermediate the points at which conduit 50 communicates with inlet conduit 42 and manifold 56. Connecting manifold 56 with the perforate conduits 44, 46 and 48, are respectively lines 60, 62 and 64. Lines 60, 62 and 64 are provided with valves 66, 68 and 70, respectively.

In normal operation valves 66, 68 and 70 are closed while valve 58 is open. The effluent from the preceding reactor in the system or from the charge preheater flows through conduits 54 and 50, main inlet conduit 42 and into reactor 10. When it is desired to take one half of the catalyst bed out of service, valve 68 is opened and valve 58 is closed. Under this condition the effluent will flow through manifold 56, line 62 and perforate conduit 46 from which it passes through only the lower half of the total catalyst within reactor 10. At the same time recycle gas is introduced into reactor 10 through lines 52, 50 and main inlet conduit 42. Similarly, if it were desired to employ three quarters of the total catalyst in reactor 10, valves 58, 68 and 70 would be closed while valve 66 would be opened thereby permitting the flow of the hydrocarbon stream through manifold 56, line 60 and perforate conduit 44.

It will be noted that the designs presented in FIGURES 1 and 2 can readily be modified to provide for a larger or smaller number of internal sections or perforated conduits so that a greater range in catalyst inventory variation is possible. Furthermore, when the reactor system under consideration includes a total of four or more reactors in series, the improvement of my invention can with advantage be applied to two or more of the terminal reactors in order to obtain an even greater degree of catalyst inventory variation.

I claim:

1. In a process for catalytically reforming a naphtha hydrocarbon charge stock wherein a naphtha hydrocarbon stream and hydrogen are passed through a series of reaction zones containing separate fixed beds containing given amounts of a platinum-containing catalyst under reforming conditions of temperature, pressure, space velocity and hydrogen to hydrocarbon ratio, heating the naphtha hydrocarbon stream to reforming temperature prior to its introduction to each of said zones, the improvement which comprises continuing the reforming until there is decrease in hydrocarbon charge naphthene content and then passing the naphtha hydrocarbon stream through a lesser portion of said given amount of catalyst in at least the last reaction zone to optimized weight hourly space velocity for maximum liquid product yield while maintaining the operating continuity of the process, introducing recycle gas from said reforming process to the portion of catalyst through which the naphtha stream is not flowing, said lesser portion of catalyst in at least the last reaction zone being equal to $(FR/WHSV) - C_k$, where FR is the naphtha feed rate being employed, WHSV is the predetermined optimum weight hourly space velocity and $C_k$ is the quantity of catalyst contained in all the reaction zones other than those in which the quantity of catalyst through which the naphtha stream flows is being varied.

2. In a process for catalytically reforming a naphtha hydrocarbon charge stock wherein a naphtha hydrocarbon stream and hydrogen are passed through a series of reaction zones containing separate fixed beds containing given amounts of a platinum-containing catalyst, under reforming conditions of temperature, pressure, space velocity, and hydrogen to hydrocarbon ratio, heating the naphtha hydrocarbon stream to reforming temperature prior to its introduction to each of said zones, the improvement which comprises continuing the reforming until there is decrease in the naphtha hydrocarbon charge stock rate and then passing the naphtha hydrocarbon stream through a lesser portion of said given amount of catalyst in at least the last reaction zone to optimize weight hourly space velocity for maximum liquid product yield while maintaining the operating continuity of the process, introducing recycle gas from said reforming process to the portion of catalyst through which the naphtha stream is not flowing, said lesser portion of catalyst in at least the last reaction zone being equal to $$(FR/WHSV) - C_k$$

where FR is the naphtha feed rate being employed, WHSV is the predetermined optimum weight hourly space velocity and $C_k$ is the quantity of catalyst contained in all the reaction zones other than those in which the quantity of catalyst through which the naphtha stream flows is being varied.

3. In a process for catalytically reforming a naphtha hydrocarbon charge stock wherein a naphtha hydrocarbon stream and hydrogen are passed through a series of reaction zones containing separate fixed beds containing given amounts of a platinum-containing catalyst, under reforming conditions of temperature, pressure, space velocity, and hydrogen to hydrocarbon ratio, heating the naphtha hydrocarbon stream to reforming temperature prior to its introduction to each of said zones, the improvement which comprises continuing the reforming until there is increase in hydrocarbon charge naphthene content and then passing the naphtha hydrocarbon stream through a greater portion of said given amount of catalyst in at least the last reaction zone to optimize weight hourly space velocity for maximum liquid product yield while maintaining the operating continuity of the process, introducing recycle gas from said reforming process to the portion of catalyst through which the naphtha stream is not flowing, said greater portion of catalyst in at least the last reaction zone being equal to $(FR/WHSV) - C_k$, where FR is the naphtha feed rate being employed, WHSV is the predetermined optimum weight hourly space velocity and $C_k$ is the quantity of catalyst contained in all the reaction zones other than those in which the quantity of catalyst through which the naphtha stream flows is being varied.

4. In a process for catalytically reforming a naphtha hydrocarbon charge stock wherein a naphtha hydrocarbon stream and hydrogen are passed through a series of reaction zones containing separate fixed beds containing given amounts of a platinum-containing catalyst, under reforming conditions of temperature, pressure, space velocity, and hydrogen to hydrocarbon ratio, heating the naphtha hydrocarbon stream to reforming temperature prior to its introduction to each of said zones, the improvement which comprises continuing the reforming until there is increase in the naphtha hydrocarbon charge stock rate and than passing the naphtha hydrocarbon stream through a greater portion of said given amount of catalyst in at least the last reaction zone to optimize weight hourly space velocity for maximum liquid product yield while maintaining the operating continuity of the process, introducing recycle gas from said reforming process to the portion of catalyst through which the naphtha stream is not flowing, said greater portion of catalyst in at least the last reaction zone being equal to $(FR/WHSV) - C_k$, where FR is the naphtha feed rate being employed, WHSV is the predetermined optimum weight hourly space velocity and $C_k$ is the quantity of catalyst contained in all the reaction zones other than those in which the quantity of catalyst through which the naphtha stream flows is being varied.

References Cited by the Examiner
UNITED STATES PATENTS

| | | | |
|---|---|---|---|
| 1,987,905 | 1/35 | Handry | 23—288 |
| 2,330,069 | 9/43 | Marshall | 208—134 |
| 2,418,672 | 4/47 | Sinclair et al. | 208—165 |
| 2,560,343 | 7/51 | Hemminger | 208—165 |
| 2,654,692 | 10/53 | Berger et al. | 208—65 |
| 2,717,231 | 9/55 | Lutz et al. | 208—136 |
| 2,779,716 | 1/57 | Newman | 208—147 |
| 3,007,862 | 11/61 | Pallon et al. | 208—65 |
| 3,067,129 | 12/62 | Dauber et al. | 208—140 |
| 3,069,348 | 12/62 | Bergstrom | 208—140 |

ALPHONSO D. SULLIVAN, *Primary Examiner.*